(No Model.)

B. TEIPEL & A. J. BANDLE.
TRAP FOR THROWING TARGETS.

No. 307,149. Patented Oct. 28, 1884.

ATTEST.
Ed R Hill
Walter C Chamberlin

INVENTOR.
Benjamin Teipel
and
Albert J. Bandle
per Wm. Hubbell Fisher Atty

UNITED STATES PATENT OFFICE.

BENJAMIN TEIPEL, OF COVINGTON, KENTUCKY, AND ALBERT J. BANDLE, OF CINCINNATI, OHIO.

TRAP FOR THROWING TARGETS.

SPECIFICATION forming part of Letters Patent No. 307,149, dated October 28, 1884.

Application filed August 21, 1883. (No model.)

*To all whom it may concern:*

Be it known that we, BENJAMIN TEIPEL, a resident of the city of Covington, in the county of Kenton and State of Kentucky, and ALBERT J. BANDLE, a resident of Cincinnati, county of Hamilton, and State of Ohio, have invented certain new and useful Improvements in Spring-Traps for Throwing Targets, of which the following is a specification.

The principal objects of our invention are to provide a trap simple and economical of construction and very portable, which is not only light in weight, but which may be readily and quickly taken to pieces or "knocked down," as the term is, and packed in a small compass for transportation, and easily and quickly again put together in a condition for use.

The several features of our invention and their use, conjointly or otherwise, will be apparent from the following specification.

Figure 1:
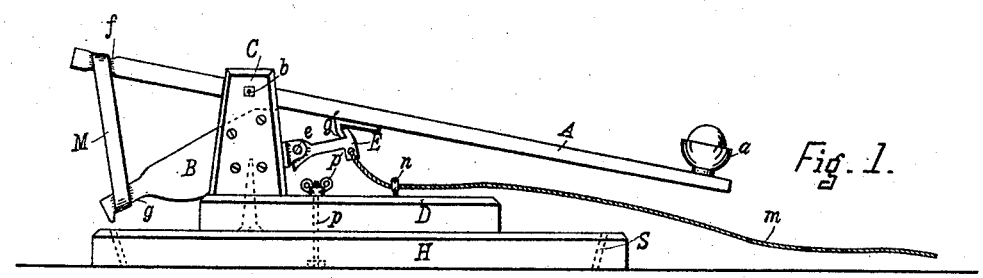
Figure 4:
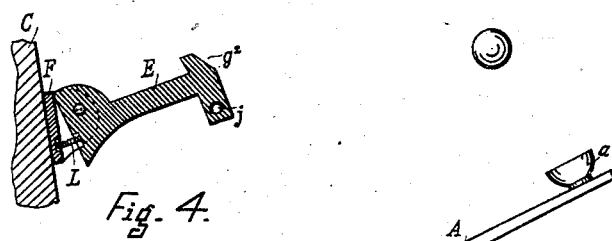
Figure 2:
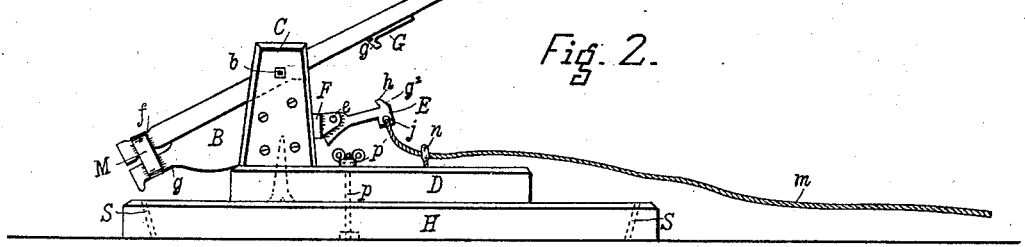
Figures 3, 5, 6, 7:
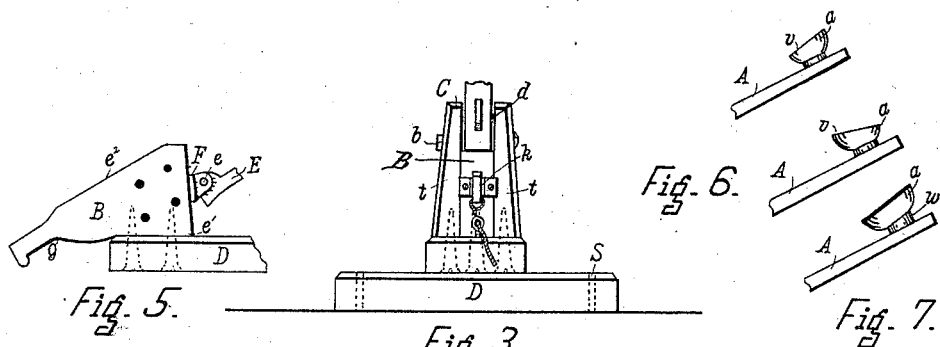

In the accompanying drawings, Figure 1 represents a side elevation of a trap embodying our invention, the trap being locked or set. Fig. 2 represents a side elevation of the same trap, the trap being sprung. Fig. 3 represents an elevation of the front end of the machine—viz., that end which is on the right hand in Figs. 1 and 2, the upper portion of the throwing-lever being broken off. Fig. 4 represents a vertical central section of the preferred form of a portion of the standard and latch. Fig. 5 represents a view of the preferred form, as hereinafter described, of a portion of the standard when the latter is made of wood. Fig. 6 shows views of the preferred form of cup and its supplanting-standard, and Fig. 7 shows a modification of said preferred form of cup and its support.

A indicates the throwing-lever, pivoted at or near one end with a suitable device, a, for holding the flying target. Where the flying target to be used is a ball, the device will preferably be of a cup shape to receive the ball. The throwing-lever is pivoted between its ends, and at a suitable point, as b, at some distance from its rear end, to a standard, C. The preferred mode of connecting it to the standard is to form a vertical slot, d, in the top of the latter. In this slot is placed the lever A, and the pivot b, upon which lever A in this case is pivoted, passes through both sides of the standard. The standard C is to be supported in any desired manner. It is preferably supported on a base, D, to which it is rigidly connected. A suitable spring is connected to the rear end of the lever, so as to continually tend to depress the rear end of the lever. When the spring is a spiral one, it may act by compression or tension. Preferably the spring acts by tension, the lower end of the spring being attached to a connection secured to the base or standard. A cheap and desirable kind of spring is a rubber band, the upper end of the band embracing and lying in a notch or depression, f, in the end of the lever A, and secured to an arm, B, rigidly secured to the standard. The lower end of the band embraces the end of said arm, and lies in a notch or depression, g.

The device for locking the throwing-lever A is preferably located at the front of the standard, and consists of a suitable latch and catch. The preferred form is that shown, and consists of the latch E, having at or near its free end the lip h and the eye or hook j, this latch being pivoted at its rear end to a projection, F, preferably provided with a recess, k, in which the rear end of the latch E is received, the pivot e passing through the sides of the recess and through the latch. The latch is preferably provided with a spring, L, which shall after the latch has been depressed operate to elevate it and keep it elevated in position to engage with the catch or projection G, secured to the under side of the lever A. For the purpose of more readily drawing down the latch, the cord m, one end of which is connected to the eye j, passes through an eye or hook, n, or equivalent projection secured preferably to the base.

When it becomes desirable to provide the trap with means whereby it may be readily rotated, a convenient means is as follows: The base is placed upon a lower base, H, and the two bases are pivotally connected by a vertical bolt, p, preferably located at or near the center of lower base, H, and of base D, the bolt $p$ being provided with a nut, $p'$, or equivalent projection to secure the two bases firmly together.

Our trap may be made of any suitable material.

For the sake of economy and lightness the standard C, arm B, base D, and lower base, H, as well as lever A, are preferably all made of wood, for the purpose of enabling the standard A and arm B to be readily and cheaply made and easily combined. A novel and peculiar combination of parts has been devised and will be described. The arm B is formed as shown in Fig. 5, and its bottom portion, $e'$, rests on base and is secured thereto by screws. The front portion, $e'$, of the arm is between the sides $t\ t$ of the standard, and said sides are secured thereto by screws or bolts, and the said sides are secured to the base by screws or bolts. Thus a strong and cheap and serviceable wooden standard and projection can be quickly made. To the front edge of the projection may be attached the projection F, carrying the latch.

The mode of operating the trap is as follows: The direction in which the flying target is to be thrown as regards the points of the compass is determined, and when the lower base, H, is absent the base D is turned so that the front end of the lever, when sprung, will fly in the desired direction. When the lower base, H, is present, the latter is in the first instance secured to the ground. A convenient mode of thus securing it is by providing a hole, S, in each corner portion of the lower base, H, and through each of these holes driving an iron rod down into the ground. These holes are preferably inclined, so that the iron rods will as they descend approach each other and operate to more firmly clamp the base to the ground, and brace it against displacement by the rapid movement of the throwing-lever. In case the lower base, H, is present, the base D, with trap, may be rotated thereon and about the bolt $p$ by loosening the nut $p'$. After the base D has been rotated so that the throwing-lever is in the desired position as regards the line of its movement as regards the points of the compass, the nut $p'$ is then tightened. The operation of latching and unlatching the throwing-lever is of course independent of the operation of setting the direction of the base, and is as follows: The front end of the lever is brought down, and the back of the catch G, which back has a bevel or inclination, $g'$, strikes against the outer edge of lip $h$ of the latch E, which lip likewise has a bevel $g^2$, (see more particularly Fig. 4,) and, throwing down the latch, the point of lip $h$ of the latch will pass outside and in front of the catch G, and the lip will engage the catch. The lever A is now set. A flying target is now connected to or placed in the free end of the lever by means of a device, $a$, as aforementioned. At the desired moment the cord $m$ is jerked, thereby unlocking the latch from the catch. The spring at rear, which is continually exerting its force upon the rear end of the lever A, now instantly draws down said rear end of the lever and throws up with force the free end of said lever. Such movement of the lever sets in motion the target and projects it with force. The flying target continues its flight after the motion of the lever has ceased by striking a suitable stop. It will be observed that such a stop is shown in the arm B, which thus here performs three functions—viz., forming part of the standard, being a holder for one end of the spring, and acting as a stop for the lever A. The angle of inclination of the trajectory of the flying target with reference to the horizon at the time the target is leaving the trap may be varied by changing the inclination of the upper surface of the stop. Another convenient mode, where the target is a ball, is shown in Fig. 6, where the plane of the edge of the cup is inclined to the longitudinal plane of the axis of the cup and its neck or support $w$, the ball in this case resting on the edges of the cup. Another mode, where the target is a ball, is in beveling the bottom support or neck, $w$. In both of these last-named modes, by turning the cup around on a pivot connected to the lever, the said inclination of the trajectory of the ball will be altered, and may, within certain obvious limits, be regulated at will.

While various features of our invention are preferably employed together, one or more of them may be used without the remainder, and one or more of them may, so far as applicable, be employed in connection with or be applied to traps of other construction than that specifically herein described.

What we claim as new, and desire to secure by Letters Patent, is—

1. The combination of lever A, support, stop-arm B, and spring located in connection with the said stop-arm B and with the rear portion of said lever, substantially as and for the purposes specified.

2. In combination, the lever, pivoted substantially as described, and the spring M, and the rigid stop-arm B, having inclined face $e^2$, substantially as and for the purposes specified.

3. In combination, the supporting-standard, the throwing-lever pivoted thereto, the arm B, and the elastic band embracing the rear end of the lever and the end of the arm B, the top of the latter being inclined, substantially as and for the purposes specified.

4. In combination, the supporting-standard, the lever A, having notch $f$ at its rear end and pivoted to the standard, arm B, having notch $g$, and being rigidly attached to the standard and extending rearwardly therefrom, and elastic band engaging the outside of the rear ends of said lever and arm, the arm having an inclined top, substantially as and for the purposes specified.

5. The combination of the supporting-piece D or its equivalent, uprights $t\ t$, arm B, forming recess $d$, lever A, working in said recess, and pivot $b$, the arm B having wrist at $g$ for the attachment of the spring, and its top inclined, the front portion of said arm B being between the uprights $t\,t$, substantially as and for the purposes specified.

6. The combination of lever A, pivoted at $b$ and lying between the sides $t\,t$, and the arm B and elastic spring, catch G, latch E, and cord $m$, and eye $n$, substantially as and for the purposes specified.

7. The combination of the pivoted throwing-lever working on a pivot supported by a standard, spring-catch G, located on the lower side of the lever, between the standard and the free end of the said lever, and having beveled surface $g'$, projecting downward and forward, and the spring-latch E, projecting nearly horizontally from the front side of the standard, and provided with upwardly-extending lip $h$, cord, and eye $n$, located below, substantially as and for the purposes specified.

8. The combination of the pivoted throwing-lever working on a pivot supported by a standard, spring-catch G, located on the lower side of the lever, between the standard and the free end of the said lever, and having beveled surface $g'$, projecting downward and forward, and the spring-latch E, projecting nearly horizontally from the front side of the standard, and provided with upwardly-extending lip $h$, having upward and rearward bevel face $g^2$, substantially as and for the purposes specified.

9. The combination of the throwing-lever, pivoted substantially as described, and operated by a spring, and having beveled catch G, located on the lever, between the standard C and the free end of said lever, and the pivoted latch E, located on the front portion of the support, and having beveled lip $h$, and eye $j$, and spring L, located between the standard and the latch, substantially as and for the purposes specified.

10. The combination of throwing-lever A and the ball-cup, an inclined bearing-surface being interposed between the cup and the lever, the cup being arranged to rotate, and thus to change its inclination with reference to the longitudinal and the transverse axis of the lever, substantially as and for the purposes specified.

BEN. TEIPEL.
ALBERT J. BANDLE.

Attest:
J. WM. STREHLI,
WALTER CHAMBERLIN.